United States Patent [19]

Sanada

[11] Patent Number: 5,461,268
[45] Date of Patent: Oct. 24, 1995

[54] SPINDLE MOTOR FOR A MAGNETIC DISK DRIVE

[75] Inventor: Yotaro Sanada, Tokyo, Japan

[73] Assignee: NEC Corporation, Tokyo, Japan

[21] Appl. No.: 49,432

[22] Filed: Apr. 20, 1993

[30] Foreign Application Priority Data

Apr. 20, 1992 [JP] Japan .................................. 4-099102

[51] Int. Cl.⁶ ............................ H02K 5/24; H02K 7/14; G11B 17/08
[52] U.S. Cl. ...................... 310/51; 310/67 R; 360/98.07
[58] Field of Search ........................... 310/43, 51, 67 R; 360/98.07, 99.04, 99.08

[56] References Cited

U.S. PATENT DOCUMENTS

| | | | |
|---|---|---|---|
| 3,974,406 | 8/1976 | Wehde | 310/67 R |
| 4,060,745 | 11/1977 | Linscott, Jr. | 310/43 |
| 4,117,359 | 9/1978 | Wehde | 310/67 R |
| 4,617,484 | 10/1986 | Buijsen | 310/51 |
| 4,623,812 | 11/1986 | van de Griend | 310/51 |
| 4,647,803 | 3/1987 | von der Heide et al. | 310/51 |
| 4,760,299 | 7/1988 | Dickie et al. | 310/51 |
| 5,235,227 | 8/1993 | Fazekas | 310/51 |

*Primary Examiner*—Clayton E. LaBalle
*Attorney, Agent, or Firm*—Sughrue,Mion, Zinn, Macpeak & Seas

[57] ABSTRACT

A spindle motor applicable to a magnetic disk drive and carrying a stack of magnetic disks thereon. When an armature oscillates due to a great current fed thereto, O-rings intervening between the armature and a shaft damp the oscillation before it is transmitted to a housing and a cover via the shaft. The O-rings, therefore, allow the motor to rotate at high speed while producing a minimum of noise.

3 Claims, 2 Drawing Sheets

SPINDLE MOTOR FOR A MAGNETIC DISK DRIVE

BACKGROUND OF THE INVENTION

The present invention relates to a magnetic disk drive accommodating a magnetic disk for storing data and, more particularly, to the structure of a spindle motor incorporated in a magnetic disk drive for rotating a stack of disks mounted thereon.

It is a common practice with computers and word processors to install a magnetic disk drive for driving a magnetic data recording medium or media, e.g., floppy disks, hard disks or similar magnetic disks. The magnetic disk drive usually rotates magnetic disks by a spindle motor. Hard disks, for example, are mounted on the spindle motor to be rotatable integrally therewith. Today, the rotation speed of the spindle motor is increasing to implement a high speed magnetic disk drive. In this respect, the conventional spindle motor of the type carrying disks integrally therewith as mentioned above has a problem, as follows. This type of spindle motor has an armature or coil affixed to a shaft. When a great current is fed to the armature to increase the rotation speed of the spindle motor, the armature oscillates. The oscillation is transmitted to a housing and a cover via the shaft, causing them to oscillate and produce noise.

SUMMARY OF THE INVENTION

It is therefore an object of the present invention to provide a spindle motor for a magnetic disk drive which produces a minimum of noise even when rotated at high speed.

A spindle motor for a magnetic disk drive of the present invention comprises a spindle hub supporting a stack of magnetic disks for storing data on the outer periphery thereof and supporting a magnet and a yoke at an intermediate portion of the inner periphery thereof, two bearings respectively having outer races thereof supported by the upper end and the lower end of the spindle hub, a shaft supporting inner races of the two bearings at the upper end and the lower end thereof, respectively, and supporting an armature at a position corresponding to the magnet and yoke, a housing to which the lower end of the shaft is affixed, and two O-rings intervening between the armature and the shaft. The O-rings may be made of resin or vibration-proof rubber.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
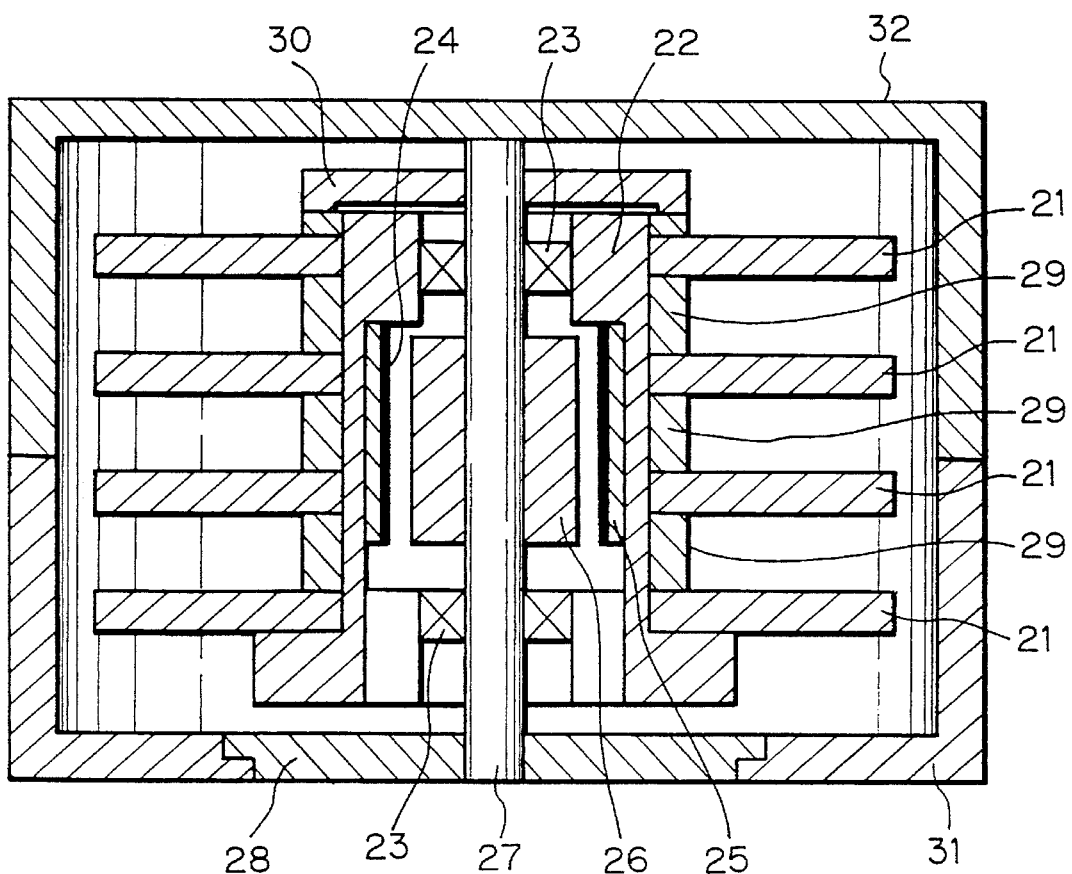
FIG. 1 is a section showing a conventional spindle motor for a magnetic disk drive.

To better understand the present invention, a brief reference will be made to a prior art spindle motor for a magnetic disk drive, shown in FIG. 1. As shown, the spindle motor is generally made up of a spindle hub 22, a shaft 27, and a housing 28. Magnetic disks or similar magnetic recording media 21 and spacers 29 are alternately stacked on the outer periphery of the spindle hub 22. A magnet 24 and a yoke 25 are affixed to the inner periphery of and at the intermediate between opposite ends of the spindle hub 22. Bearings 23 respectively have their outer races supported by the upper end and the lower end of the inner periphery of the spindle hub 22. The inner races of the bearings 23 respectively are supported by the upper end and the lower end of the shaft 27. An armature in the form of a coil 26 is affixed to the shaft 27 in a position corresponding to the magnet 24 and yoke 25. The lower end of the shaft 27 is affixed to the housing 28. The magnet 24, yoke 25 and armature 26 facing the magnet 24 and yoke 25 constitute a drive system. The disks 21 and spacers 29 are rigidly clamped by a clamp ring 30. The housing 28 is fastened to a base 31 by screws, not shown. The shaft 27 is supported by a cover 32 at the upper end thereof. The housing 28, base 31 and cover 32 form a so-called disk enclosure hermetically enclosing the stack of disks 21 and other parts mentioned above.

As the normal rotation speed of the spindle motor is increased, the current to flow through the armature 26 also increases to cause it to oscillate. The oscillation of the armature 26 is transmitted to the housing 28 and cover 32 via the shaft 27. As a result, the housing 28 and cover 32 oscillate to produce noise. The oscillation of the armature 26 is not noticeable so long as the spindle motor is rotated at relatively low speed. However, the noise ascribable to the oscillation is aggravated when the rotation speed is increased to implement a high speed magnetic disk drive, as stated earlier.

Figure 2:
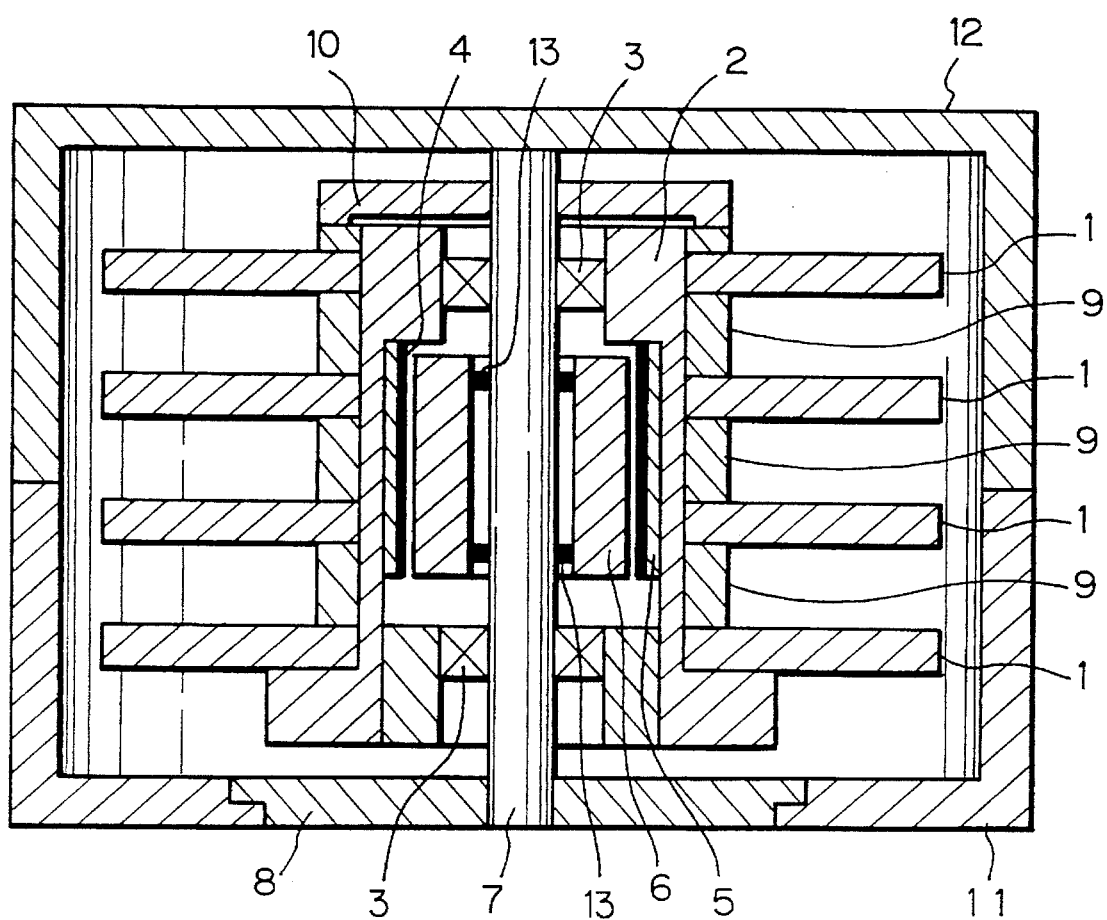
FIG. 2 is a section showing a spindle motor for a magnetic disk drive embodying the present invention.

Referring to FIG. 2, a spindle motor embodying the present invention is shown which is free from the above-discussed problem. As shown, the spindle motor has a stack of disks or data recording media 1, a spindle hub 2, bearings 3, a magnet 4, a yoke 5, an armature or coil 6, a shaft 7, a housing 8, spacers 9, a clamp ring 10, a base 11, and a cover 12 which are constructed and arranged in the same manner as in the conventional spindle motor. In the illustrative embodiment, two O-rings 13 are interposed between the armature 6 and the shaft 7 and made of resin or vibration-proof rubber. In this configuration, when the armature 6 oscillates due to a great current fed thereto, the O-rings 13 damp the oscillation and prevents it from being directly transmitted to the shaft 7. Consequently, the oscillation to be transferred from the shaft 7 to the housing 8 and cover 12 is also damped to reduce noise.

In summary, it will be seen that the present invention provides a spindle motor for a magnetic disk drive which is rotatable with a minimum of noise due to O-rings intervening between an armature and a shaft. When the armature oscillates due to a great current fed thereto, the 0-rings damp the oscillation before it is transmitted to a housing and a cover via the shaft.

Various modifications will become possible for those skilled in the art after receiving the teachings of the present disclosure without departing from the scope thereof.

What is claimed is:

1. A spindle motor for a magnetic disk drive, comprising:

a spindle hub supporting a stack of magnetic disks for storing data on outer periphery thereof and supporting a magnet and a yoke at an intermediate portion of inner periphery thereof;

two bearings respectively having outer bearings thereof supported by an upper end and a lower end of said spindle hub;

a shaft supporting inner races of said two bearings at an upper end and a lower end thereof, respectively, and supporting an armature at a position corresponding to said magnet and said yoke;

a housing to which the lower end of said shaft is affixed; and two O-rings intervening between said armature and said shaft;

wherein said O-rings prevent oscillation of said armature from being imparted to at least one of said shaft and said housing.

2. A spindle motor as claimed in claim 1, wherein said two O-rings are made of resins.

3. A spindle motor as claimed in claim 1, wherein said two O-rings are made of vibration-proof rubber.

* * * * *

Adverse Decisions In Interference

Patent No. 5,461,268, Yotaro Sanada, SPINDLE MOTOR FOR A MAGNETIC DISK DRIVE, Interferenee No. 103,767, final judgment adverse to the patentee rendered April 30, 1998, as to claims 1, 2 and 3.

*(Official Gazette July 7, 1998)*